United States Patent [19]

Schluenz

[11] Patent Number: 4,879,351

[45] Date of Patent: Nov. 7, 1989

[54] ISOMERIZED TERPENE TACKIFIER RESINS

[75] Inventor: Robert W. Schluenz, Panama City, Fla.

[73] Assignee: Arizona Chemical Company, Panama City, Fla.

[21] Appl. No.: 232,024

[22] Filed: Aug. 15, 1988

[51] Int. Cl.$^4$ ............................................. C08F 8/00
[52] U.S. Cl. ................................ 525/332.1; 525/356; 528/481; 528/490
[58] Field of Search ................. 528/481, 490; 525/350

[56] References Cited

U.S. PATENT DOCUMENTS

| | | | |
|---|---|---|---|
| 3,780,124 | 12/1973 | Davis | 260/675.5 |
| 4,080,320 | 3/1978 | Schluenz et al. | 260/78 UA |
| 4,377,510 | 3/1983 | Ruckel et al. | 260/97 |
| 4,447,354 | 5/1984 | Scharrer et al. | 260/106 |

Primary Examiner—Joseph L. Schofer
Assistant Examiner—Bernard Lipman
Attorney, Agent, or Firm—Luedeka, Hodges & Neely

[57] ABSTRACT

A novel copolymer resin which has excellent tackifying properties for selected elastomers useful in hot melt and pressure sensitive adhesives is produced by the copolymerization of beta-pinene with other terpenes or hydrocarbon monomers, followed by thermal catalytic isomerization of the resin produced. Typically, beta-pinene and styrene (80/20) are copolymerized at a temperature between 0° to 60° C. under anhydrous conditions with a Lewis acid catalyst in a solvent. After catalyst removal, the copolymer resin is isomerized with iodine as a catalyst at a temperature between 200° to 260° C. Excellent yields of high softening point tackifier resins are produced.

12 Claims, No Drawings

ISOMERIZED TERPENE TACKIFIER RESINS

The use of high softening point (90° to 130° C.), amorphous, low molecular weight (Mn 600 to 4000) polyterpene resins, hydrocarbon resins, and copolymers of terpenes with hydrocarbon monomers to tackify elastomers such as rubbers and ethylene-vinyl acetate to produce pressure sensitive and hot melt adhesives has been demonstrated in commerce and in many patents. The elastomer or high molecular weight polymer (Mn 60,000 or higher) provides the cohesive strength and the low molecular weight tackifier resin provides the tack or the ability of the adhesive to wet and adhere to the surface to be coated.

Historically, "pure" polyterpene resins were used to tackify natural rubber and produced the pressure sensitive adhesives of the 1940's. Adhesive technology grew rapidly and synthetic ethylene-vinyl acetate polymer was introduced and, when combined with terpene resins, was used to produce hot melt adhesives. The technology of adhesives ballooned further and many new elastomers were introduced, especially block copolymers. As new elastomers were introduced, new tackifiers were required and design of tackifiers to meet specific compatibility needs of specific elastomers became critical. This required development of new tackifier resins from pure monomers and combinations of monomers.

Representative of the prior art embodying the foregoing technologies are the disclosures in U.S. Pat. Nos. 2,567,918; 3,297,673; 3,313,865; 3,467,632; 3,929,747; and 4,391,961.

Additionally, resin color has become very important since in many modern uses light colored adhesives are required; i.e., coatings, disposables, etc. These resins, being extremely light and color stable, fit these specific needs well. Such resins are disclosed in U.S. Pat. Nos. 4,391,961 and 4,487,901.

The object of this invention is to prepare tackifier resins designed to have specific compatibility with a variety of elastomers useful in the development of adhesive formulations for differentiated uses. The resins produced by the technology of this invention allow easy formulation of pressure sensitive and hot melt adhesives compounded from block elastomers, ethylene-vinyl acetate polymers, and rubbers. The design of the resins of this invention allows formulation of adhesives which meet temperature service requirements, strength properties for a multiplicity of uses, and color requirements.

These objectives were best met with resins produced by the present invention in which the copolymerization of commercial beta-pinene with other terpene monomers or hydrocarbon monomers at a temperature between 0° to 60° C. is followed by catalytic isomerization of the initial resin with an effective amount of iodine to produce a tackifier resin of the desired compatibility.

Other terpene monomers which can be used in this invention include alpha-pinene, dipentene, limonene, and various commercial turpentine fractionation cuts Representative of the hydrocarbon monomers used in this invention are styrene, alpha-methyl styrene, p-methyl styrene, and piperylene. Depending on the intended use, combinations of terpenes and hydrocarbon monomers will be used as the co-monomers.

The initial polymerization or copolymerization uses a Lewis acid and the normal technology of cationic polymerization as described in U.S. Pat. Nos. 3,761,457 and 3,737,418. The resin produced at this stage is usable for some adhesive applications; however, its efficacy is significantly improved by the novel additional catalytic isomerization step which is the subject of this invention.

This isomerization step is carried out at a temperature between 200° to 260° C. after the polymerization of the monomers is complete and the polymerization catalyst is removed. An effective amount of iodine is used to catalytically isomerize the resin. It has been found that the amount of iodine employed should preferably be between about 0.05 and 0.5 percent by weight based upon the weight of resin. Optionally, transition metals such as zinc and iron may be employed with the iodine. In that case they are preferably present in about 0.002 to about 0.0002 percent by weight based upon the weight of the resin. Most preferably, when zinc or iron is used, the level of metal should be about 0.2 to 0.4 weight percent of the iodine. Nobel metals can also be used to isomerize the resin but are usually not cost effective. Other disproportionation catalysts such as sulfur, sulfur dioxide or selenium can also be used, however these materials lead to odor or toxicity problems. Once isomerized, low molecular weight products are removed from the resin under vacuum or by steam-vacuum stripping to obtain a resin product of optimum softening point. The use of iodine not only causes isomerization but also improves the color of the resin. The amount or degree of isomerization can be demonstrated by the increase in UV absorption in the aromatic range and by the increased compatibility with the more polar elastomers such as ethylene-vinyl acetate.

The tackifier resins produced by the method of this reaction are novel and work well for tackification of various elastomers, finding utility in pressure sensitive adhesives, coating, and hot melt adhesives as described below.

Ethylene-vinyl acetate, when combined with an isomerized resin prepared from a beta-pinene/styrene mixture, makes excellent light colored, hot melt coatings and hot melt sealing adhesives. When used as coatings, they are often blended with microcrystalline and/or paraffin waxes to extend the formulation, reduce cost and reduce moisture vapor transmission. In formulation of hot melt adhesives, naphthenic oils, terpene or hydrocarbon oligomers are blended in to control flexibility. As is well known in the art, antioxidants are used at low levels to maintain stability of the product prior to, during, and after application.

The resins of this invention easily tackify block elastomers, for example, styrene-isoprene-styrene elastomers such as Kraton ® 1107 and styrene-butadiene-styrene elastomers such as Stereon ® 840, and result in adhesive formulations well fitted for fiber to polyethylene bonding and for the construction of disposable absorbent assemblies.

Also contemplated for use in adhesive formulations are the isoprene rubbers, neoprene rubber, and random styrene-butadiene rubbers. The following examples describe the invention in more detail.

EXAMPLE 1 POLYMERIZATION

A series of tackifier resins was prepared by the following procedure: To a suitable reaction vessel equipped with stirrer, inert gas inlet, dropping funnels, screw feeder for aluminum chloride, overflow tube, and thermometer, are added 80 parts by weight of mixed xylenes followed by the addition of three parts anhydrous AlCl₃ as catalyst. Then, 100 parts of a monomer or monomer mixture is metered into the resultant slurry over a ten minute interval while maintaining the temperature between 40° to 45° C. This fills the reactor to the overflow tube. The continuous phase of the polymerization is then carried out by simultaneous proportionate metering to the reactor of the following: (a) a solution of 800 parts of monomers in 650 parts of xylene and (b) 24 parts of anhydrous AlCl₃ During this continuous phase of the polymerization, the reaction mixture overflows into a second stirred reactor maintained at 40° to 45° C. The contents of this reactor then cascade into water, deactivating the catalyst. After completion of the reaction, the polymerization mixture is heated to 60° C. and the organic phase is separated and washed with water until neutral. The solvent is removed by distillation and the molten resin is steam stripped to remove low molecular weight oligomers. The composition and properties of a series of resins prepared by this method are shown in Table I.

TABLE I

| Example | Composition of Monomer Mixture (%) | Tackifier Resin | | |
|---|---|---|---|---|
| | | Yield % | Ring & Ball Softening Point (°C.) | Elvax ® 250 Compatibility |
| A | 100 Beta-Pinene | 98 | 126 | None |
| B | 100 Beta-Pinene | 98 | 121 | None |
| C | 60 Dipentene<br>40 Beta-Phellandrene | 88 | 110 | Poor |
| D | 90 Beta-Pinene<br>10 Styrene | 100 | 113 | None |
| E | 85 Dipentene<br>15 Styrene | 100 | 108 | Good |
| F | 85 Dipentene<br>15 Styrene | 100 | 108 | Good |
| G | 80 Beta-Pinene<br>20 Alpha-Methyl Styrene | 99 | 107 | Good |
| H | 80 Beta-Pinene<br>20 Styrene | 100 | 106 | Good |
| I | 80 Beta-Pinene<br>20 Para-Methyl Styrene | 100 | 117 | Good |

Elvax ® 250 is a commercially available ethylene-vinyl acetate polymer resin

EXAMPLE 2 ISOMERIZATION

Resins prepared by the method of Example 1 described in Table I can be isomerized as follows:

The resin, 100 parts, is introduced to a reactor and blanketed with inert gas. The temperature of the resin is raised to 235° to 240° C. and 0.1 parts of iodine or 0.1 parts of iodine and 0.0004 parts of zinc powder (0.4% of the iodine) are added. The mixture is stirred four hours while maintaining the resin at 235° to 240° C. with cooling if necessary. After completion of the isomerization, the molten resin is stripped to the desired softening point by heating under vacuum. The properties of the resins produced are shown in Table II.

EXAMPLE 3 POLYMERIZATION

A polymer was prepared as in Example 1 using commercial alpha-pinene for the monomer. The catalyst system was changed to three parts anhydrous AlCl₃ and one part trimethylchlorosilane and the polymerization temperature changed to 5° C. The isolated polymer had a 99° C. ring and ball softening point and the yield was 90%. It had good compatibility with Elvax ® 250. This resin was isomerized, as in Example 2, with 0.1% I₂ and 0.0002% zinc (0.2% of the iodine). The final resin had a 71° C. softening point and was obtained in 91% yield. It was completely compatible with Elvax ® 250.

TABLE II

| Example | Isomerization Catalyst | Isomerized Tackifier Resin | | |
|---|---|---|---|---|
| | | Yield % | Ring & Ball Softening Point (°C.) | Elvax ® 250 Compatibility |
| A | 0.1% I₂ | 88 | 105 | Good |
| B | 0.1% I₂<br>0.0004% Zn | 86 | 106 | Good |
| C | 0.1% I₂<br>0.0004% Zn | 86 | 94 | Good |
| D | 0.1% I₂<br>0.0004% Zn | 85 | 95 | Complete |
| E | 0.1% I₂ | 96 | 105 | Complete |
| F | 0.1% I₂<br>0.0004% Zn | 94 | 107 | Complete |
| G | 0.1% I₂<br>0.0004% Zn | 80 | 89 | Complete |
| H | 0.1% I₂ | 88 | 99 | Complete |
| I | 0.1% I₂ | 94 | 108 | Complete |

EXAMPLE 4 ISOMERIZATION

The polymer as prepared in Example B, Table I, was catalytically isomerized using iodine 0.1% and 0.0002% iron (0.2% of the iodine) in place of zinc. This resin had a softening point of 100° C. at 86% yield. The Elvax ® 250 compatibility was good.

EXAMPLE 5 ADHESIVE FORMULATION

Tackifier resin and isomerized tackifier resin (Tables I and II, Example D), 100 parts, were separately compounded with ethylene-vinyl acetate copolymer (Elvax ® 250), 100 parts, and wax (Aristowax 165), 100 parts, to produce a hot melt carton sealing adhesive. The tensile properties shown below in Table III for the isomerized tackifier are typical of a good carton sealing adhesive.

TABLE III

| Resin | At Yield | | At Break | |
|---|---|---|---|---|
| | Strength PSI | Elongation % | Strength PSI | Elongation % |
| Isomerized Tackifier | 515 | 45 | 570 | 440 |
| Tackifier | 450 | 20 | 500 | 80 |

EXAMPLE 6 ADHESIVE FORMULATION

Pressure sensitive adhesives were prepared from ismerized tackifier resins of Examples B, E, G, and I from Table II by formulation of 100 parts of tackifier resin at 100 parts of styrene-isoprene-styrene block rubber elastomer (Kraton® 1107) in 230 parts hydrocarbon solvent, and 0.2% of BHT antioxidant based on the rubber. This solution was coated on Mylar® film to give a 1 mil. thickness dry coating and was conditioned and tested for pressure sensitive properties by Pressure Sensitive Tape Council methods. The results were as shown in Table IV.

TABLE IV

| Table II Example | Rolling Ball Tack In. | 1800 Peel 03/In. | | Shear Minutes (60 C) | |
|---|---|---|---|---|---|
| | | Initial | Two Weeks | Initial | Two Weeks |
| B | 6 | 80 | 80 | >10,000 | 2,500 |
| E | >11 | 45 | 46 | >10,000 | >10,000 |
| G | 8 | 50 | 52 | >10,000 | >10,000 |
| I | 8 | 52 | 53 | >10,000 | >10,000 |

It should be understood by those skilled in the art that variations, modifications, and combinations of the above embodiments are contemplated and can be effected without departing from the spirit and scope of the invention as disclosed and claimed.

What is claimed is:

1. A method for producing tackifier resins of improved compatibility with elastomers from terpene polymers or copolymers of terpene and hydrocarbon monomers which comprises isomerization of said polymers or copolymers by heating them to a temperature between 200° to 260° C. in the presence of an effective catalytic amount of iodine.

2. A method according to claim 1 wherein the terpene polymer is formed by polymerization of beta-pinene.

3. A method according to claim 1 wherein the copolymer is formed by the polymerization of a mixture of beta-pinene and styrene.

4. A method according to claim 1 wherein the terpene polymer is formed by polymerization of at least one member of the group consisting of beta-pinene and dipentene; an the copolymer is formed by copolymerizing a mixture of at least one member of the group consisting of beta-pinene and dipentene with at least one member of the group consisting of styrene, alpha-methyl styrene, and para-methyl styrene.

5. A method according to claim 4 wherein between 60-80% of the copolymers is contributed by a terpene monomer.

6. A method according to claim 1 wherein the isomerization temperature is between 235° and 240° C.

7. A method according to claim 4 wherein the isomerization temperature is between 235° and 240° C.

8. A method according to claim 1 or 4 wherein about 0.05 to 0.5 weight percent of iodine is used based upon the weight of the resin.

9. A method according to claim 1 or 4 wherein about 0.002 to 0.0002 weight percent of zinc or iron powder, based on the amount of resin is used in conjunction with the iodine catalyst.

10. A method according to claim 1 or 4 wherein about 0.2 to 0.4 weight percent of zinc or iron powder, based on the amount of iodine used, is used in conjunction with the iodine catalyst.

11. An isomerized tackifier resin of improved compatibility with elastomers produced according to the method of claim 1.

12. An isomerized tackifier resin of improved compatibility with elastomers produced according to claim 4.

* * * * *

UNITED STATES PATENT AND TRADEMARK OFFICE
CERTIFICATE OF CORRECTION

PATENT NO. : 4,879,351
DATED : November 7, 1989
INVENTOR(S) : Robert W. Schluenz It is certified that error appears in the above-identified patent and that said Letters Patent is hereby corrected as shown below:

Column 1, line 61, after "cuts" insert -- . --.

Column 2, line 36, "coating" should be -- coatings --.

Column 6, line 10, Claim 4, after "dipentene;" delete "an" and insert -- and --.

Signed and Sealed this

Eleventh Day of June, 1991

Attest:

HARRY F. MANBECK, JR.

Attesting Officer

Commissioner of Patents and Trademarks